US007358657B2

United States Patent
Koelger et al.

(10) Patent No.: US 7,358,657 B2
(45) Date of Patent: Apr. 15, 2008

(54) LAMP ASSEMBLY (75) Inventors: John M. Koelger, Corvallis, OR (US); P. Guy Howard, Junction, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 289 days.

(21) Appl. No.: 11/094,100

(22) Filed: Mar. 29, 2005

(65) Prior Publication Data

US 2005/0185406 A1 Aug. 25, 2005

Related U.S. Application Data

(63) Continuation-in-part of application No. 10/769,355, filed on Jan. 30, 2004, now Pat. No. 7,021,767.

(51) Int. Cl.
*H01J 5/16* (2006.01)
*H01J 61/40* (2006.01)
*G03B 21/18* (2006.01)
*G02B 5/08* (2006.01)
*F21V 29/00* (2006.01)

(52) U.S. Cl. .......................... 313/113; 353/52; 353/56; 362/293; 362/294; 362/341; 359/838

(58) Field of Classification Search ................. 353/52, 353/55, 57, 60, 85, 119, 56; 362/293, 294, 362/267, 310, 345, 341; 492/112; 352/143, 352/146; 355/30; 345/75.2; 313/11, 46, 313/113, 146, 148, 151, 545, 552, 570, 632; 220/2.3 R; 359/838
See application file for complete search history.

(56) References Cited

U.S. PATENT DOCUMENTS

| 2,793,472 | A | * | 5/1957 | Heer et al. ..................... 65/23 |
| 3,808,496 | A | * | 4/1974 | McRae et al. ............... 313/113 |
| 4,179,037 | A | * | 12/1979 | Chan et al. ............... 220/2.3 R |
| 4,599,540 | A | * | 7/1986 | Roberts ....................... 313/570 |
| 4,672,270 | A | | 6/1987 | Ito et al. |
| 5,228,770 | A | | 7/1993 | Brunson |
| 5,281,889 | A | * | 1/1994 | Fields et al. ................. 313/113 |
| 5,569,978 | A | | 10/1996 | Oiye et al. |
| 5,781,692 | A | | 7/1998 | Wagner |
| 5,785,543 | A | | 7/1998 | Dietrich |
| 6,023,875 | A | | 2/2000 | Fell et al. |
| 6,114,807 | A | * | 9/2000 | Kavanagh .................... 313/570 |
| 6,181,053 | B1 | * | 1/2001 | Roberts ......................... 313/46 |
| 6,218,780 | B1 | | 4/2001 | Ehrlichmann et al. |
| 6,404,112 | B1 | * | 6/2002 | Frings et al. ................ 313/113 |
| 6,538,383 | B1 | | 3/2003 | Takeuchi |
| 2004/0233137 | A1 | * | 11/2004 | Kodera et al. ............. 345/75.2 |
| 2006/0163990 | A1 | * | 7/2006 | Huizar et al. ............... 313/113 |

\* cited by examiner

*Primary Examiner*—Melissa Jan Koval (57) ABSTRACT

A lamp assembly includes a reflector body having an integral crimping portion that extends inwardly over a channel formed in the reflector body, a seal feature arranged within the channel, a cathode assembly having an edge feature extending into the channel, and a resilient member held in a state of compression between the crimping portion and a first surface of the edge feature such that an opposing second surface of the edge member is held against the sealing feature thereby creating a hermetic seal between the cathode assembly and the reflector body.

18 Claims, 7 Drawing Sheets

LAMP ASSEMBLY

RELATED APPLICATIONS

This application is a CIP of U.S. application Ser. No. 10/769,355 filed Jan. 30, 2004 now U.S. Pat. No. 7,021,767, which application is hereby incorporated by reference herein.

BACKGROUND

Digital projectors, such as digital mirror devices (DMD) and liquid crystal display (LCD) projectors, project high-quality images onto a viewing surface. Both DMD and LCD projectors utilize high-intensity burners and reflectors to generate the light needed for projection. Light generated by the burner is concentrated as a "fireball" that is located at a focal point of a reflector. Light produced by the fireball is directed into a projection assembly that produces images and utilizes the generated light to form the image. The image is then projected onto a viewing surface.

Efforts have been directed at making projectors more compact while making the image of higher and better quality. As a result, the lamps utilized have become more compact and of higher intensity. An example of one type of such lamp is a xenon lamp. Xenon lamps provide a relatively constant spectral output with significantly more output than other types of lamps without using substantial amounts of environmentally harmful materials, such as mercury. In addition, xenon lamps have the ability to hot strike and subsequently turn on at near full power.

Xenon lamps include an anode and a cathode. The anode and cathode are precisely positioned relative to one another such that a gap is established between them. The application of a voltage to the cathode causes the voltage to arc to the anode in the presence of the pressurized xenon gas, thereby generating light. In addition to generating light, the xenon lamp also produces thermal energy. As per the ideal gas law, as this thermal energy raises the temperature of the xenon lamp, the pressure in the xenon lamp must also rise. In order for the lamp to remain operational, the xenon gas within the lamp assembly must be retained.

SUMMARY

A lamp assembly includes a reflector body having an integral crimping portion that extends inwardly over a channel formed in the reflector body, a seal feature arranged within the channel, a cathode assembly having an edge feature extending into the channel, and a resilient member held in a state of compression between the crimping portion and a first surface of the edge feature such that an opposing second surface of the edge member is held against the sealing feature thereby creating a hermetic seal between the cathode assembly and the reflector body.

BRIEF DESCRIPTION OF THE DRAWINGS

The accompanying drawings illustrate various embodiments of the present apparatus and method and are a part of the specification. The illustrated embodiments are merely examples of the present apparatus and method and do not limit the scope of the disclosure.

Throughout the drawings, identical reference numbers designate similar, but not necessarily identical, elements.

DETAILED DESCRIPTION

A lamp assembly for use in a display system is provided herein that includes robust and readily formed seals. Several sealing configurations described herein make use of washers, such as spring washers and ring seals. These components provide sealing for pressurized gas within a lamp assembly during operation of the lamp assembly. The operational pressure may be as high as 800-1000 psig or more. These methods and sealing configurations may reduce the cost of manufacturing, while reducing the use of tungsten inert gas welding techniques currently used. Such methods may also reduce the use of skilled operators for the manufacture of the lamp assembly.

According to one exemplary embodiment, a spring washer, such as a Belleville or Wave type spring washer is used in conjunction with a metallic ring seal, such as a Wills-type ring seal, to seal a cathode assembly to a reflector body. Other exemplary embodiments discussed herein make use of an integral sealing surface formed on the reflector body that interacts with a spring washer to provide sealing between the cathode assembly and the reflector body. Still another exemplary embodiment discussed herein makes use of a deformable metallic ring, such as a copper ring, in conjunction with a spring washer to provide such sealing. Exemplary lamp assemblies according to each of these configurations will be discussed herein.

In the following description, for purposes of explanation, numerous specific details are set forth in order to provide a thorough understanding of the present method and apparatus. It will be apparent, however, to one skilled in the art, that the present method and apparatus may be practiced without these specific details. Reference in the specification to "one embodiment" or "an embodiment" means that a particular feature, structure, or characteristic described in connection with the embodiment is included in at least one embodiment. The appearance of the phrase "in one embodiment" in various places in the specification are not necessarily all referring to the same embodiment.

Display System

Figure 1:
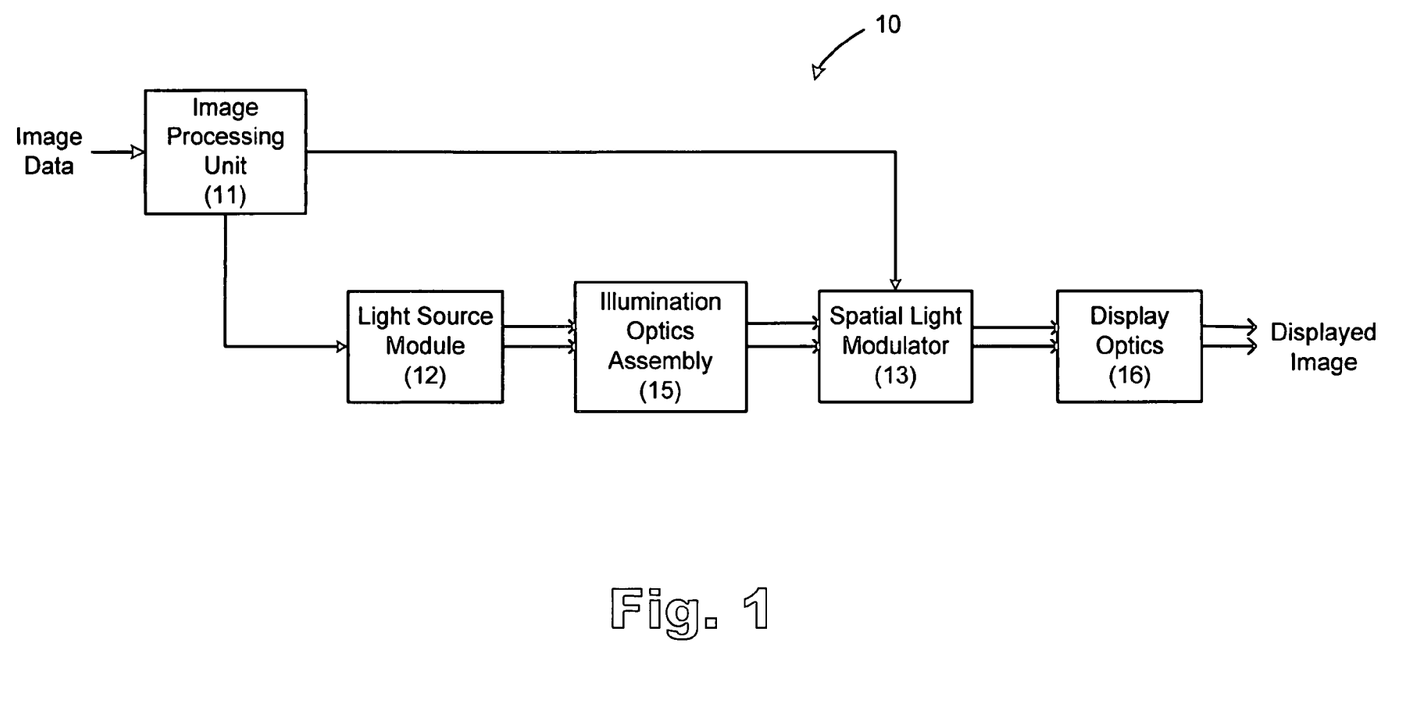
FIG. 1 illustrates a schematic view of a display system according to one exemplary embodiment.

FIG. 1 illustrates an exemplary display system (10). The components of FIG. 1 are exemplary only and may be modified or changed as best serves a particular application. As shown in FIG. 1, image data is input into an image processing unit (11). The image data defines an image that is to be displayed by the display system (10). While one image is illustrated and described as being processed by the image processing unit (11), it will be understood by one skilled in the art that a plurality or series of images may be processed by the image processing unit (11). The image processing unit (11) performs various functions including controlling the illumination of a light source module (12) and controlling a spatial light modulator (SLM) (13).

As will be discussed in more detail below, the light source module (12) includes a lamp assembly, which includes an anode and a cathode coupled to a reflector. The lamp assembly also includes a sealing configuration that provides a robust and is simply formed seal. Several sealing configurations will be discussed in more detail below.

The light source module (12) is positioned with respect to an illumination optics assembly (15). The illumination optics assembly (15) directs light from the light source module (12) to the SLM (13). The terms "SLM" and "modulator" will be used interchangeably herein to refer to a spatial light modulator. The incident light may be modulated in its phase, intensity, polarization, or direction by the modulator (13). Thus, the SLM (13) of FIG. 1 modulates the light based on input from the image processing unit (11) to form an image-bearing beam of light that is eventually displayed or cast by display optics (16) on a viewing surface (not shown).

The display optics (16) may include any device configured to display or project an image. For example, the display optics (16) may be, but are not limited to, a lens configured to project and focus an image onto a viewing surface. The viewing surface may be, but is not limited to, a screen, television, wall, liquid crystal display (LCD), or computer monitor.

Lamp Assembly with Ring Seal and Spring Washer

Figure 2:
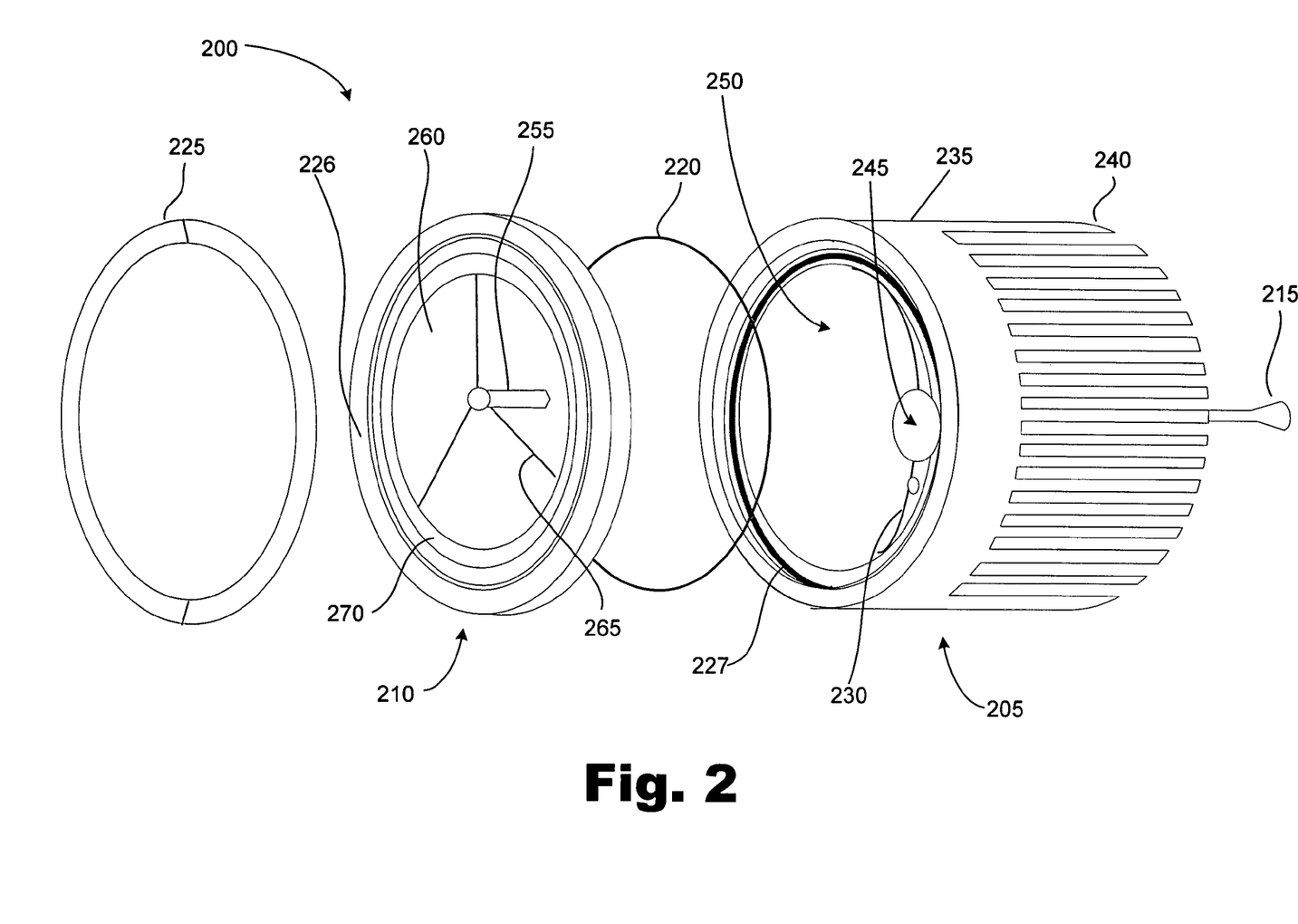
FIG. 2 illustrates an exploded perspective view of a lamp assembly according to one exemplary embodiment.

FIG. 2 illustrates an exploded view of a lamp assembly (200) that includes an integrated unit (205), a cathode assembly (210), and an anode (215). When the lamp assembly (200) is assembled, the anode (215) is sealingly coupled to the integrated unit (205). The cathode assembly (210) is also sealingly coupled to the integrated unit (205). In particular, a ring seal (220), a resilient member, such as a spring washer (225), and an edge feature, such as an isolation ring (226) may be used to establish a seal between the cathode assembly (210) and the integrated unit (205). According to the present exemplary embodiment, a sealing feature, such as a ring seal (220) is located between the spring washer (225) and integrated unit (205) and is placed within a channel (227) formed in the end of the integrated unit (205). The ring seal (220), spring washer (225), and isolation ring (226) will be discussed below in more detail with reference to FIG. 3.

The integrated unit (205) includes an integral reflector and heat sink. For ease of reference only, a xenon lamp assembly will be discussed in more detail with reference to FIG. 2. However, those of skill in the art will appreciate that other types of lamps may make use of an integrated unit (205) and the sealing configurations described below. The integrated unit (205) includes a reflective surface (230), a body (235), a plurality of integral cooling fins (240), and a reflector opening (245). The integrated unit (205) reflects visible light out and dissipates energy through the body (235) and the cooling fins (240).

The reflective surface (230) is formed in a cavity (250) defined in a distal end of the body (235). The cavity (250), according to one exemplary embodiment, may be hyperbolic or parabolic in profile. As a result, a substantial portion of light originating from a focal point of the cavity (250) reflects off the reflective surface (230) and out of the integrated unit (205). In a xenon lamp assembly, light is generated when voltage arcs from an anode to a cathode in the presence of a pressurized gas, such as xenon. The sealing configuration of the cathode assembly (210) to the integrated unit (205) helps retain the pressurized gas within the lamp assembly (200). This sealing configuration is shown in more detail in FIG. 3.

Light in the visible spectrum is the desired output of a lamp used in projector systems. However, lamps frequently also generate significant radiant energy outside the visible spectrum. The reflective surface (230) may include a radiation absorption layer, such as an infrared and/or ultraviolet radiation absorption material, to convert radiant energy to thermal heat. As radiant energy is converted to thermal heat by the infrared and/or ultraviolet radiation absorption layer, the radiant heat is absorbed by the body (235) of the integrated unit (205).

According to one exemplary embodiment, the body (235) is metallic. The use of a metallic body allows thermal heat to be more readily absorbed by the body (235), such that the body (235) is an integrated heat sink. Heat absorbed by the body (235) is then conveyed to the cooling fins (240).

The amount of heat transferred by an object depends, at least in part, on the exposed surface area of the object. The cooling fins (240) increase the heat transfer rate by increasing the exposed surface area of the integrated unit (205). The spacing of the cooling fins (240) helps ensure that as air around one cooling fin is heated, that heated air will not substantially heat air around an adjacent cooling fin, which would slow heat transfer.

The amount of heat transferred from an object by convection, either natural or forced, depends at least in part on how the air flows over the object. Heat transfer may be maximized by increasing the speed of the airflow and/or by making the airflow turbulent. In the case of airflow generated in fan assemblies, the speed of the airflow used to cool lamps may be somewhat limited because of the noise, size, and other considerations. Accordingly, it may be desirable to make the air flow turbulent as it flows over the integrated unit (205).

The cooling fins (240) enhance heat removal from the body (235) by creating turbulence. The cooling fins (240) are elongated members integrally formed with the body (235) and thus may be made from the same material. The shape of the cooling fins (240) is such that an airflow that passes over the cooling fins (240) becomes turbulent. Causing the airflow to become turbulent may increase the heat transfer rate of the integrated unit (205) by as much as a factor of two or more.

In the exemplary embodiment shown in FIG. 2, the anode (215) is coupled to an integrated unit (205) by passing the anode (215) through the reflector opening (245). When the entire lamp assembly (200) is assembled, the end of the anode (215) and the end of the cathode (255) are spaced a precise distance from each other.

The distance by which the anode (215) and the cathode (255) are separated is referred to as the gap distance. By establishing the proper gap distance, light is generated when voltage is applied to the anode (215) while the cavity (250) is filled with a pressurized gas, such as xenon.

According to one exemplary embodiment, the cathode assembly (210) provides an electrical path between the anode (215) and a cathode (255) while providing support for the cathode (255). The cathode assembly (210) includes the cathode (255), a window (260), a cathode support structure (265) and a face cap (270). According to the present exemplary embodiment, the isolation ring (226) is also coupled to the face cap (270). In particular, the window (260), the cathode support structure (265), and the isolation ring (226) may be sealing coupled to the face cap (270) through a vacuum brazing operation or by any other suitable process.

The cathode (255) may also be thus coupled to the cathode support structure (265) to support the cathode (255). Accordingly, the face cap (270) and the cathode support structure (265) provide physical support for the cathode (255).

The cathode support structure (265) and the face cap (270) also provide thermal and electrical pathways for the cathode (255). For example, according to one exemplary embodiment, both the face cap (270) and the cathode support structure (265) are made of a material with low thermal resistance, such as metal.

The integrated unit (205) reduces the amount of heat that accumulates in the cavity (250). In addition, less radiation is reflected out of the integrated unit (205) and through the lens (260) because radiation may be absorbed by an infrared and/or ultraviolet radiation absorption layer applied to the reflective surface (230). Accordingly, the amount of heat dissipated by the face cap (270) and the amount of radiant energy conveyed to the lens (260) may also be reduced.

In addition to providing thermal pathways and providing for the use of less expensive materials, the cathode support structure (265) and the face cap (270) provide an electrical pathway for the cathode (255). The cathode support structure (265) and the face cap (270) are made of electrically conductive material, such as metal, so that cathode (255) is at substantially the same voltage level as the face cap (270). The face cap (270) is electrically charged. Consequently, when voltage is applied to the cathode (255) in the presence of a pressurized gas, the voltage arcs across the gap distance to the anode (215) because the anode (215) is at a lower voltage level or ground. This arc provides the "fireball."

Figure 3:
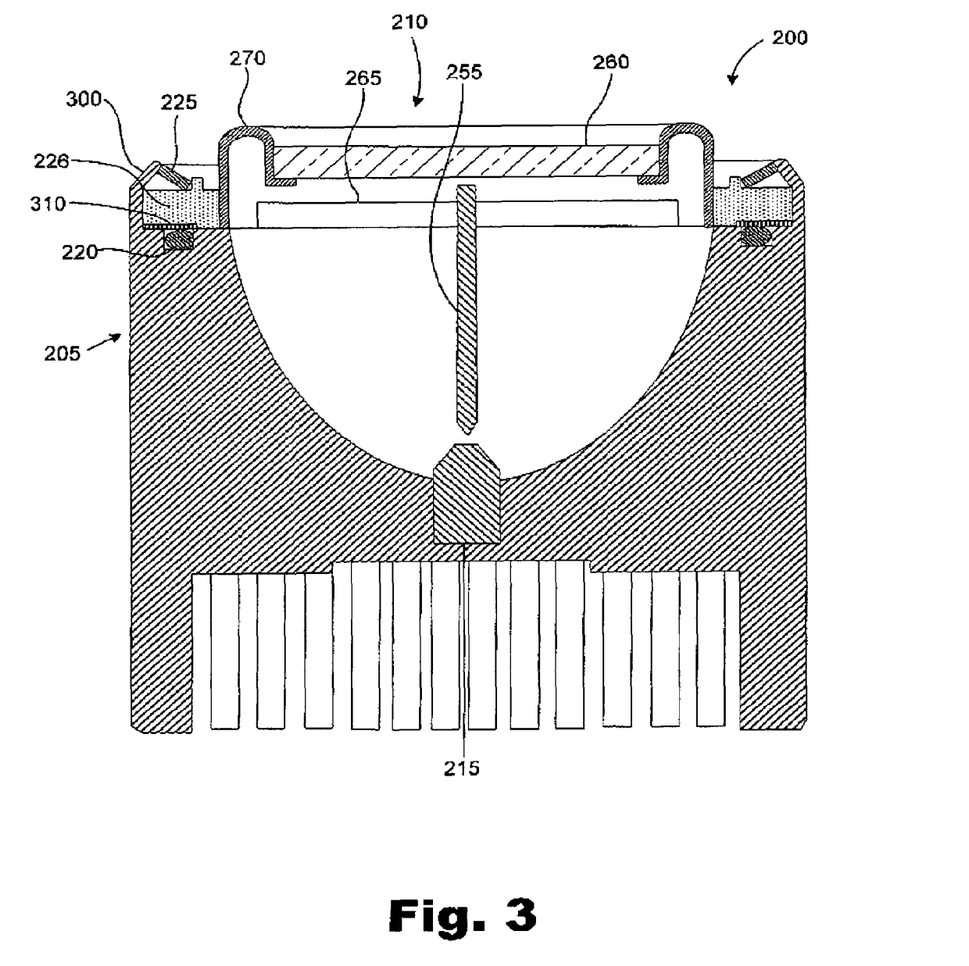
FIG. 3 is cross sectional view of the lamp assembly shown in FIG. 2 according to one exemplary embodiment.

FIG. 3 illustrates a cross sectional view of the lamp assembly (200) showing the sealing configuration of the lamp assembly (200) in more detail. A ring seal (220), such as a metallic C-ring seal, is placed at least partially within the channel (227; FIG. 2) formed in one end of the integrated unit (205). The ring seal (220) is configured to interface with the cathode assembly (210). In particular, the cathode assembly (210) includes a window (260) that is supported by a face cap (270). The face cap (270) in turn is coupled to the isolation ring (226). The interior portion of the spring washer (225) is placed into contact with the isolation ring (226). The isolation ring (226) is then placed into contact with the integrated unit (205) and in particular into contact with the ring seal (220).

The spring washer (225) is configured to be placed in contact with crimping portions (300). More specifically, the crimping portions (300) are configured to be plastically deformed into a crimped position. As the crimping portions (300) are thus deformed, they exert a compressive force on the outer portion of the spring washer (225). As the spring washer (225) is compressed, it is urged toward complete contact about its interior portion with the outer portion of the isolation ring (226). As the spring washer (225) is pushed flat, it transfers the compressive force through the isolation ring (226) to the ring seal (220).

The compressive force on the ring seal (220) causes an interference fit between the isolation ring (226) and the ring seal (220), thereby establishing a seal between the cathode assembly (210) and the integrated unit (205). The interference fit, and thus the seal, between the isolation ring (226) and the ring seal (220) may be enhanced by depositing a thin layer of metallic material on the interior portion of the isolation ring (226). The thin layer of metallic material (310) may be formed of a soft metallic material, such as gold, gold paste, or copper, which allows for a more extensive interference fit between the layer of metallic material (310) as the ring seal (220) deforms the metallic layer (310) in response to the compressive force.

The isolation ring (226) may allow the cathode assembly (210; FIG. 2) to be electrically isolated from the integrated unit (205; FIG. 2). As introduced, the isolation ring (226) may be formed of an electrically insulating material, such as a ceramic material. According to the present exemplary embodiment illustrated in FIG. 3, the isolation ring (226) is between the cathode assembly (210; FIG. 2) and the integrated unit (205; FIG. 2) such that the cathode assembly (210; FIG. 2) does not directly contact the integrated unit (205; FIG. 2).

The sealing configuration may be rapidly established using relatively simple operations. For example, the ring seal (220) may be rapidly placed within the channel (227; FIG. 2) while minimizing or reducing the use of specialized labor. Further, a preassembled cathode assembly (210) may be rapidly placed into contact with the ring seal (220). After which, the spring washer (225) can be placed upon the cathode assembly (210), and thereafter a relatively simple crimping operation may be performed to form the seal, as previously discussed. Suitable spring washers (225) include, without limitation, Belleville-type and wave-type washers. Suitable ring seals include, without limitation, steel C-type Wills-type ring seals. Other configurations also make use of spring washers, as will now be discussed in more detail.

Integral Sealing Surface

Figure 4:
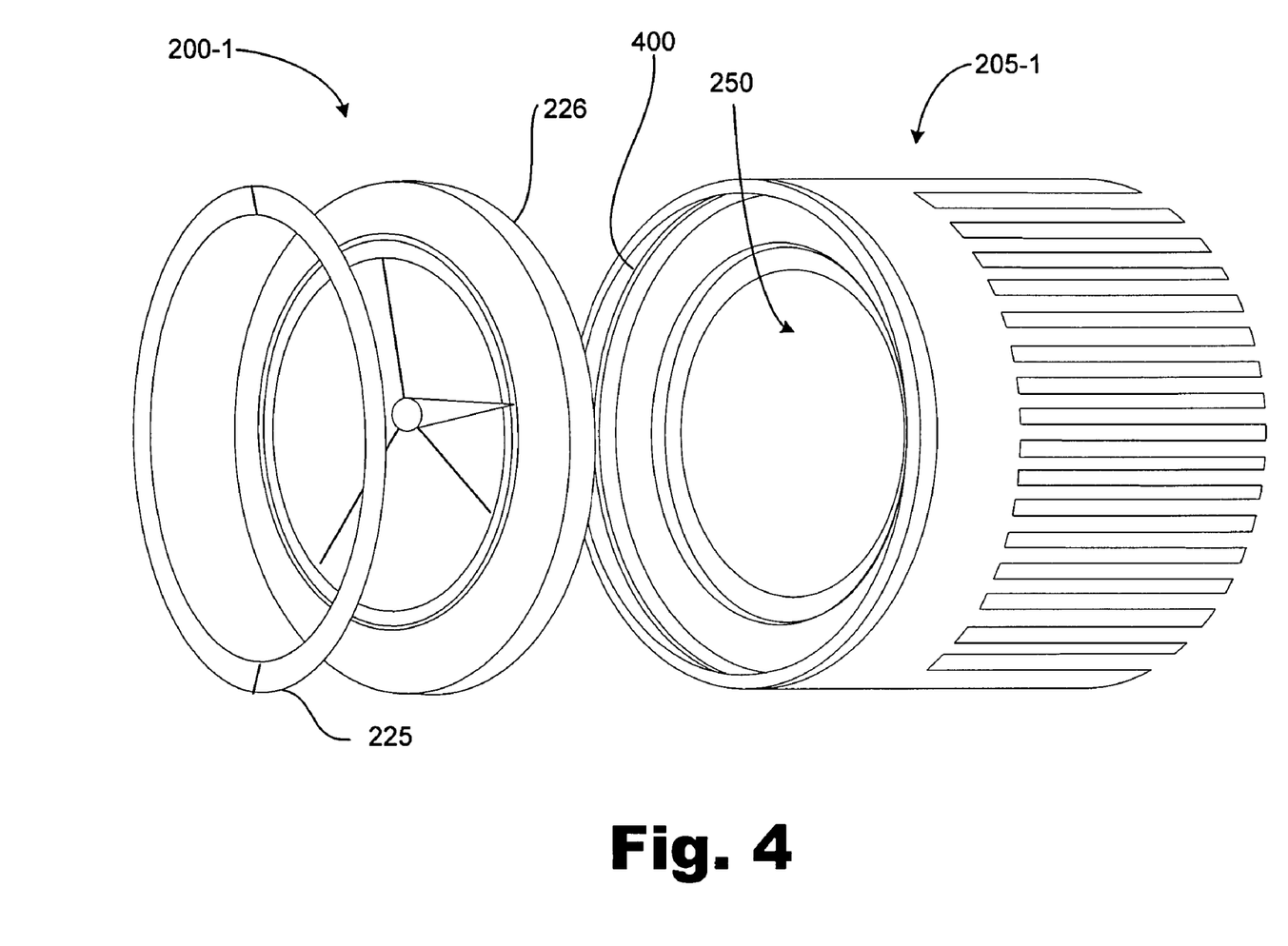
FIG. 4 is an exploded perspective view of a lamp assembly.
Figure 5:
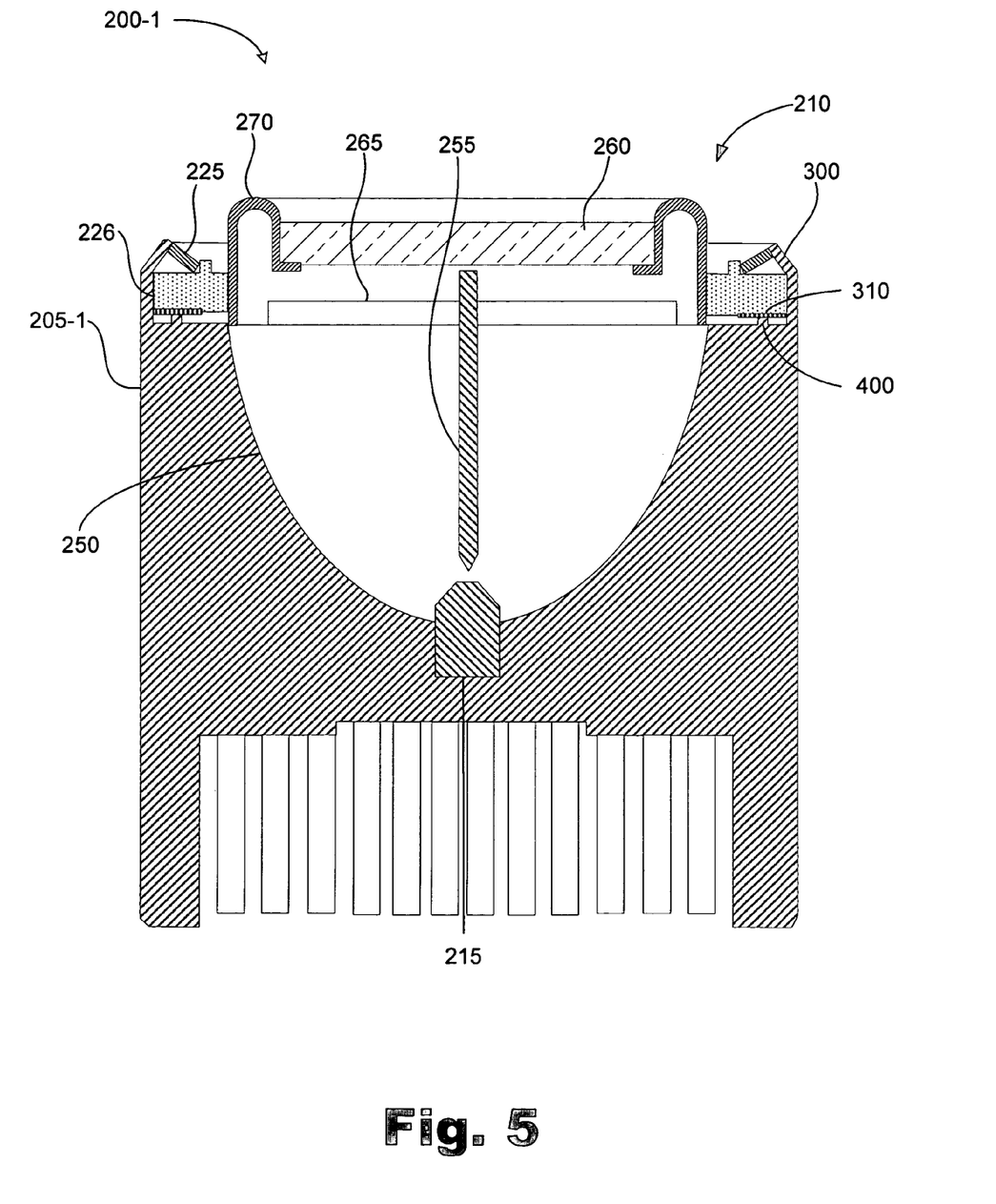
FIG. 5 is a cross sectional view of a lamp assembly according to one exemplary embodiment.

FIGS. 4 and 5 illustrate a lamp assembly (200-1) that includes an integrated unit (205-1) having an integral sealing surface (400). In particular, FIG. 4 illustrates a perspective view of the lamp assembly (200-1) and FIG. 5 illustrates a cross sectional view of the lamp assembly (200-1).

The integral sealing surface (400) is formed around the perimeter of the opening of the cavity (250) during the formation of the integrated unit (205-1). In particular, the integrated unit may be formed using molding and/or machining operations. The integral sealing surface may be formed during this process, such as by including features in the mold that correspond to the resulting shape of the integral sealing surface (400). Further, the integral sealing surface may be formed by machining processes, such as by turning or milling operations.

Accordingly, the integral sealing surface (400) is formed around the perimeter of the opening of the cavity (250). The dimensions of the integral sealing surface (400) correspond approximately to the dimensions of a soft metallic layer (310) formed on the isolation ring (226). As a result, when the isolation ring (226) is placed in contact with the integrated unit (205-1), the layer of soft material (310) is placed into contact with the integral sealing surface (400).

The integrated unit (205-1) also includes crimping portions (300). As the crimping portions (300) are plastically deformed against the spring washer (225), the crimping portions (300) exert a compressive force on the spring washer (225), as previously discussed. This compressive force results in an interference fit between the soft metallic layer (310) and the integral sealing surface (400). The resulting interference fit creates the hermetic seal to thereby retain the pressurized xenon gas within the lamp assembly (200-1). Other exemplary embodiments make use of a copper ring seal, as will be discussed in more detail.

Dead-Soft Copper Ring Seal

Figure 6:
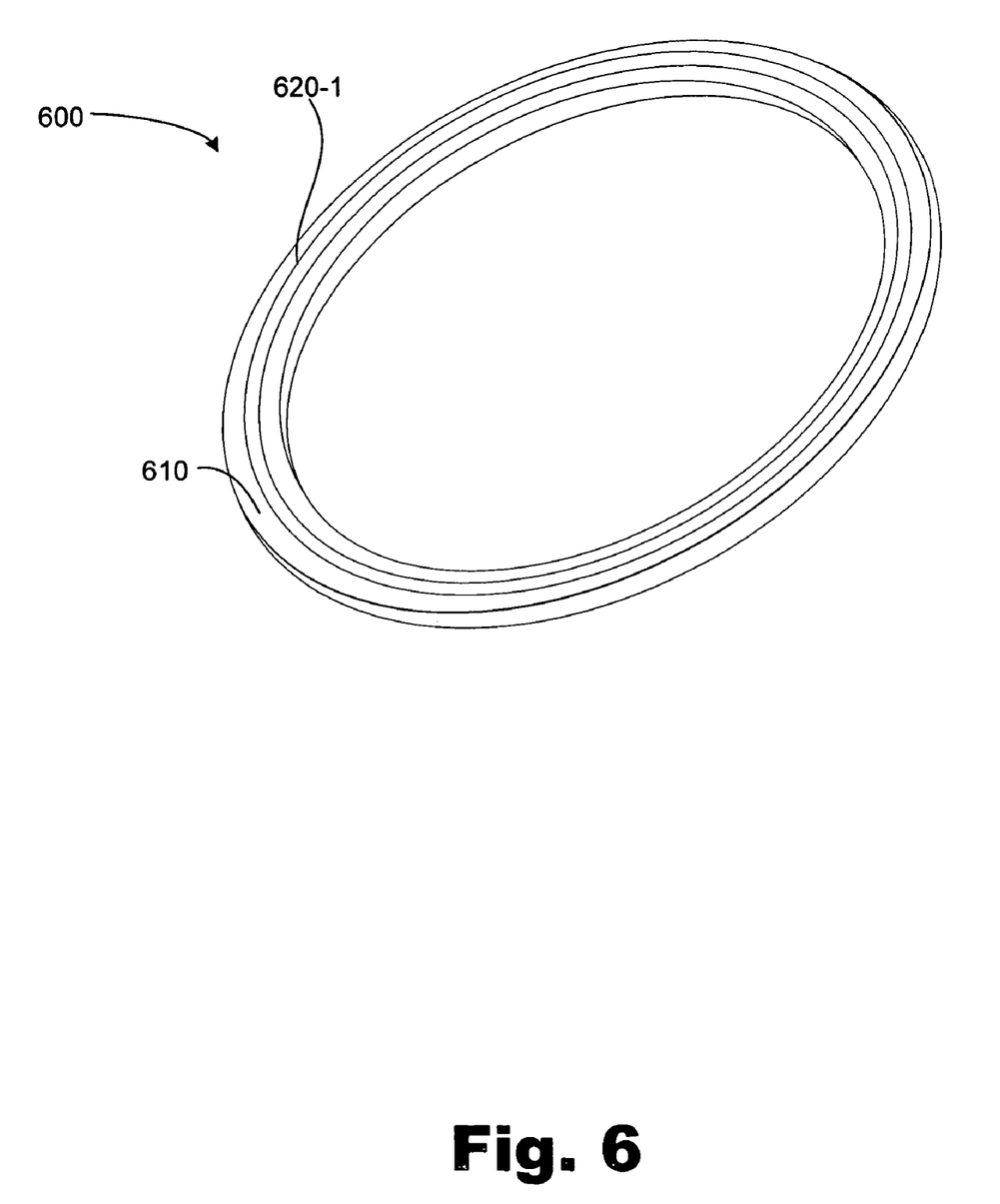
FIG. 6 is a perspective view of a soft metallic ring seal according to one exemplary embodiment.

FIG. 6 illustrates a copper ring seal (600). The deformable ring seal (600) has geometry that deforms under the force created by the compression of a spring washer (225). The deformable ring seal (600) includes a generally flat portion (610) and raised portions (620-1, 620-2, best seen in FIG. 7) on each side of the flat portion (610). These raised portions (620-1, 620-2) are configured to interface with the integrated unit (610) and the isolation ring (226) to form a hermetic seal to retain pressurized xenon gas within a lamp assembly. Such an exemplary lamp assembly is illustrated in FIG. 7.

Figure 7:
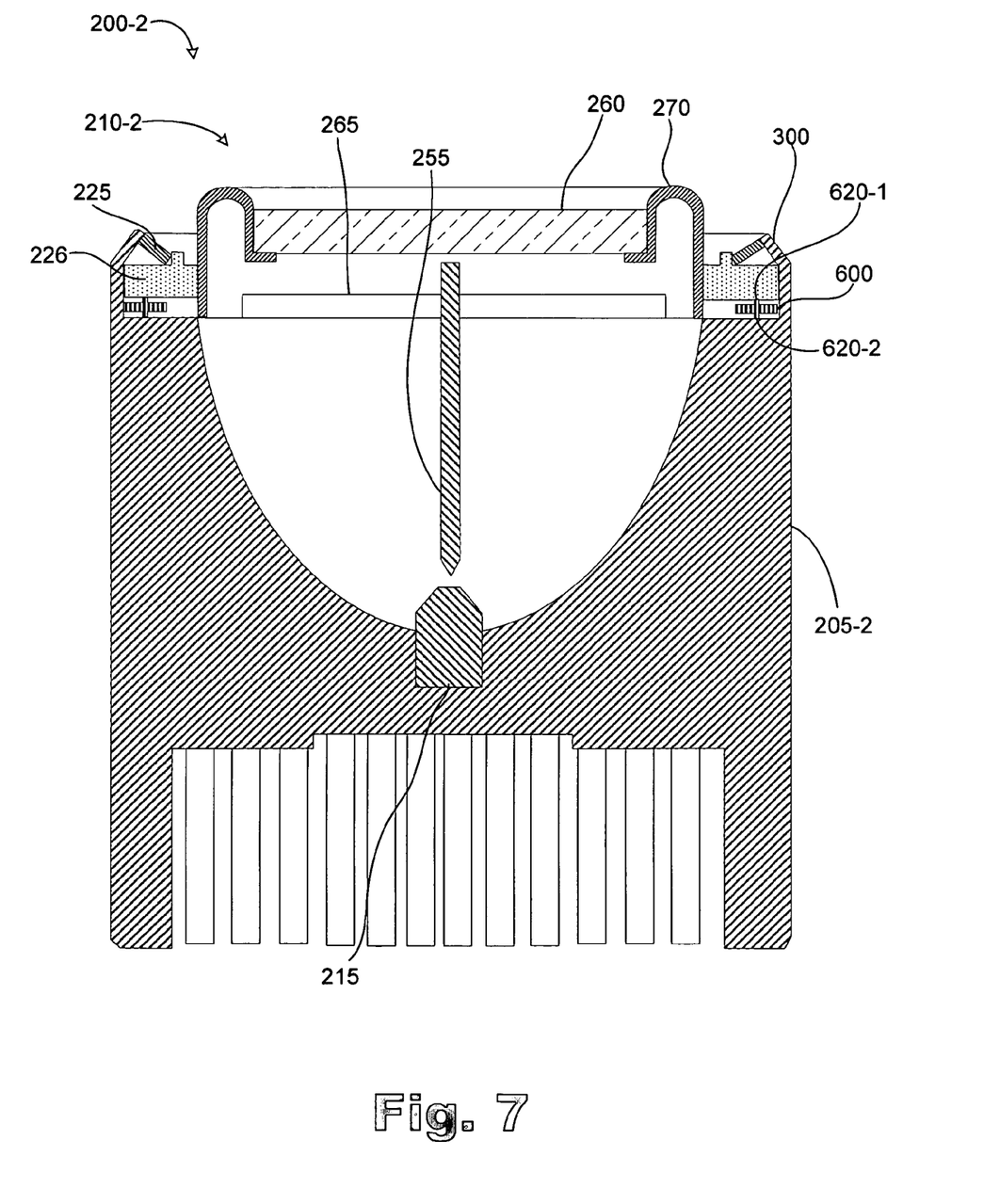
FIG. 7 is a cross sectional view of a lamp assembly according to one exemplary embodiment.

FIG. 7 illustrates a cross-sectional view of a lamp assembly (200-2). The lamp assembly (200-2) includes a deformable ring seal (600), an integrated unit (205-2), a spring washer (225), and a cathode assembly (210-2). The spring washer (225) and the deformable ring seal (600) are located between crimping portions (300) formed on the integrated unit (205-2).

As the crimping portions (300) are crimped against the spring washer (225), the spring washer exerts a compressive force through the isolation ring (226) to the deformable ring seal (600), which is between the isolation ring (226) and the integrated unit (205-2). The deformable ring seal (600) may be formed of a relatively soft material, such as copper, which is softer than both the material chosen for the integrated unit (205-2) and the material chosen for the isolation ring (226).

As a result, the compressive force due to the crimping of crimping portions (300) against the raised portions (620-1, 620-2) causes the raised portions (620-1, 620-2) to deform at interface between the isolation ring (226) and the integrated unit (205-2) respectively. The resulting deformation of the raised portions (620-1, 620-2) results in an interference fit between the deformable ring seal (600) and the integrated unit (205-2) and the isolation ring (226), thereby providing a hermetic seal to retain the pressurized gas within the lamp assembly (200-2).

In conclusion, a lamp assembly for use in a display system has been discussed herein that includes robust and readily formed seals. Several sealing configurations described herein make use of washers, such as spring washers, and ring seals. These components provide sealing for pressurized gas within a lamp assembly during operation of the lamp assembly. These operational pressures may be as high about 800-1000 psig or more. These methods and sealing configurations may reduce the cost of manufacturing, while reducing the use of welding (TIG) techniques currently used. Such methods may also reduce the use of skilled operators for the manufacture of the lamp assembly.

The preceding description has been presented only to illustrate and describe the present method and apparatus. It is not intended to be exhaustive or to limit the disclosure to any precise form disclosed. Many modifications and variations are possible in light of the above teaching. It is intended that the scope of the disclosure be defined by the following claims.

What is claimed is:

1. A lamp assembly, comprising:
   a reflector body having an integral crimping portion that extends inwardly over a channel formed in said reflector body;
   a seal feature arranged within said channel;
   a cathode assembly having an edge feature extending into said channel; and
   a resilient member held in a state of compression between said crimping portion and a first surface of said edge feature such that an opposing second surface of said edge member is held against said sealing feature thereby creating a hermetic seal between said cathode assembly and said reflector body.

2. The lamp assembly of claim 1, wherein said channel is formed about a reflector cavity that is also formed within said reflector body, and further comprising:
   an anode assembly arranged with said reflector cavity but electrically isolated from said cathode assembly; and
   a gas held within said cavity.

3. The lamp assembly of claim 1, and wherein said resilient member includes a spring washer selected from a group of spring washers comprising a Belleville washer and a Wave-type washer.

4. The lamp assembly of claim 1, wherein said seal feature includes a compressible seal member.

5. The lamp assembly of claim 4, wherein said compressible seal member includes a ring shaped seal.

6. The lamp assembly of claim 5, wherein said ring shaped seal includes at least one ring shaped seal selected from a group of ring shaped seals comprising a Wills ring and a generally C-shaped Wills ring.

7. The lamp assembly of claim 1, wherein said seal feature includes a deformable metallic member that is separate from said reflector body.

8. The lamp assembly of claim 7, wherein said deformable metallic member is made of copper.

9. The assembly of claim 7, wherein said deformable metallic member includes a generally flat portion and raised portions on opposing sides of said generally flat portion.

10. The lamp assembly of claim 1, wherein said seal feature includes a deformable metallic member that is part of said reflector body.

11. The lamp assembly of claim 1, further comprising a soft metallic layer formed on said second surface of said edge feature and in physical contact with said seal feature.

12. The lamp assembly of claim 11, wherein said soft metallic layer comprises at least one metal selected from a group of metals comprising gold and copper.

13. The lamp assembly of claim 1, wherein said reflector body further forms a plurality of fins configured to dissipate heat.

14. A display system, comprising:
   a lamp assembly having an integral reflector and heat sink for use in a projector assembly including a reflector body having an integral crimping portion that extends inwardly over a channel formed in said reflector body, a seal feature arranged within said channel, a cathode assembly having an edge feature extending into said channel, and a resilient member held in a state of compression between said crimping portion and a first surface of said edge feature such that an opposing second surface of said edge member is held against said sealing feature thereby creating a hermetic seal between said cathode assembly and said reflector body,
   an illumination optics assembly optically coupled to said lamp assembly; and
   a spatial light modulator optically coupled to said illumination optics assembly.

15. The system of claim 14, and further comprising an image processing unit configured to control said light source module and said spatial light modulator.

16. The system of claim 14, and further comprising display optics optically coupled to said spatial light modulator.

17. A lamp assembly, comprising:

an integral reflector and heat sink having a cavity defined therein;

ring shaped sealing means coupled to said integral reflector and heat sink;

an electrode;

isolation means for isolating said integral reflector and heat sink from said electrode; and compressive means for applying a compressive force to said isolation means to thereby seal said cavity.

18. The assembly of claim 17, and further comprising force transferring means for transferring said force from said compressive means to said isolation means.

* * * * *

UNITED STATES PATENT AND TRADEMARK OFFICE
CERTIFICATE OF CORRECTION

| | | |
|---|---|---|
| PATENT NO. | : 7,358,657 B2 | Page 1 of 1 |
| APPLICATION NO. | : 11/094100 | |
| DATED | : April 15, 2008 | |
| INVENTOR(S) | : John M. Koelger et al. | |

It is certified that error appears in the above-identified patent and that said Letters Patent is hereby corrected as shown below:

On the title page, item (75), under "Inventors", in column 1, line 1, delete "John M. Koelger" and insert -- John M. Koegler --, therefor.

Signed and Sealed this

Thirtieth Day of September, 2008

JON W. DUDAS
*Director of the United States Patent and Trademark Office*